(No Model.) 2 Sheets—Sheet 1.

F. E. JOHNSON.
CULTIVATOR.

No. 580,402. Patented Apr. 13, 1897.

WITNESSES:
C. E. Erickson
D. E. Carlsen

INVENTOR:
Frank E. Johnson
BY his ATTORNEY:
A. M. Carlsen (No Model.) 2 Sheets—Sheet 2.

F. E. JOHNSON.
CULTIVATOR.

No. 580,402. Patented Apr. 13, 1897.

WITNESSES:
C. E. Erickson
D. E. Carlsen

INVENTOR
Frank E. Johnson
BY his ATTORNEY:
A. M. Carlsen

UNITED STATES PATENT OFFICE.

FRANK E. JOHNSON, OF MINNEAPOLIS, MINNESOTA.

CULTIVATOR.

SPECIFICATION forming part of Letters Patent No. 580,402, dated April 13, 1897.

Application filed March 27, 1896. Serial No. 585,109. (No model.)

*To all whom it may concern:*

Be it known that I, FRANK E. JOHNSON, a subject of the King of Sweden and Norway, residing at Minneapolis, in the county of Hennepin and State of Minnesota, have invented certain new and useful Improvements in Cultivators; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in cultivators of the class drawn by horses or other animals.

The objects of my invention are, first, to provide a cultivator which is supported on casters and may be raised and lowered thereon to different depths in the ground or elevated so as to clear the ground in driving it; second, to provide a cultivator with reversible teeth, of which either end may be turned toward the ground; third, to provide a cultivator with sharp-edged teeth, so that the weeds may be cut and spread and not tangled and crowded up in front of the teeth; fourth, to provide a cultivator in which the teeth are arranged in such a spread and zigzag order that the weeds have no chance to fill up between them, even when the cultivator-frame is adjusted to a very narrow gate; fifth, to provide a cultivator with casters or carrier-wheels in which sand cannot get in between the journals and spoil the bearings, as is so often the case with common cultivator-wheels, especially those of the small type having their center near the ground; sixth, to provide a cultivator which may be adjusted as to its width, without loosening any bolts or nuts, simply by a latch or dog lever placed within easy reach of the driver.

With these and other objects in view my invention consists in the novel construction and arrangement of parts illustrated in the accompanying drawings, in which—

Figure 1:
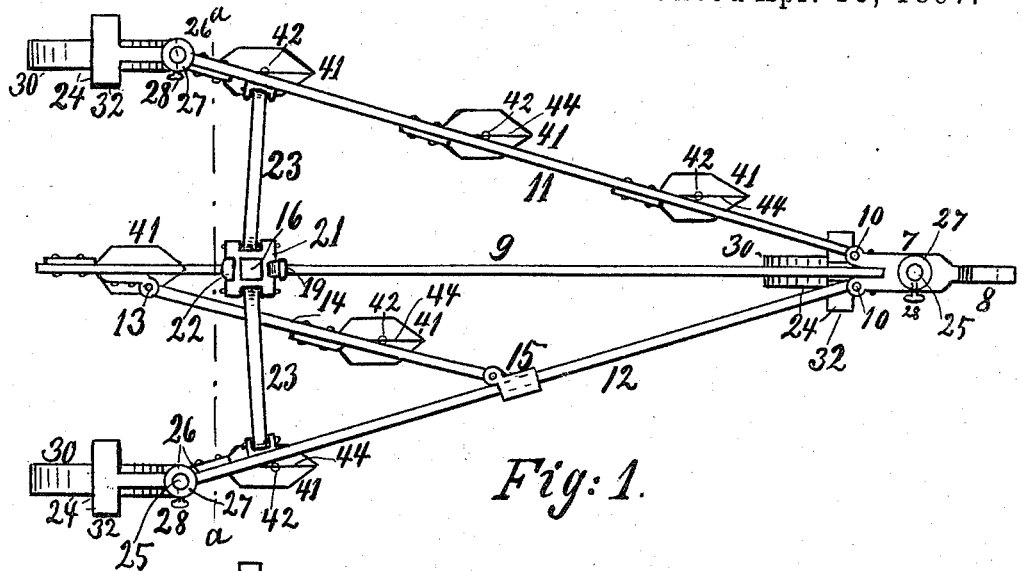
Figure 2:
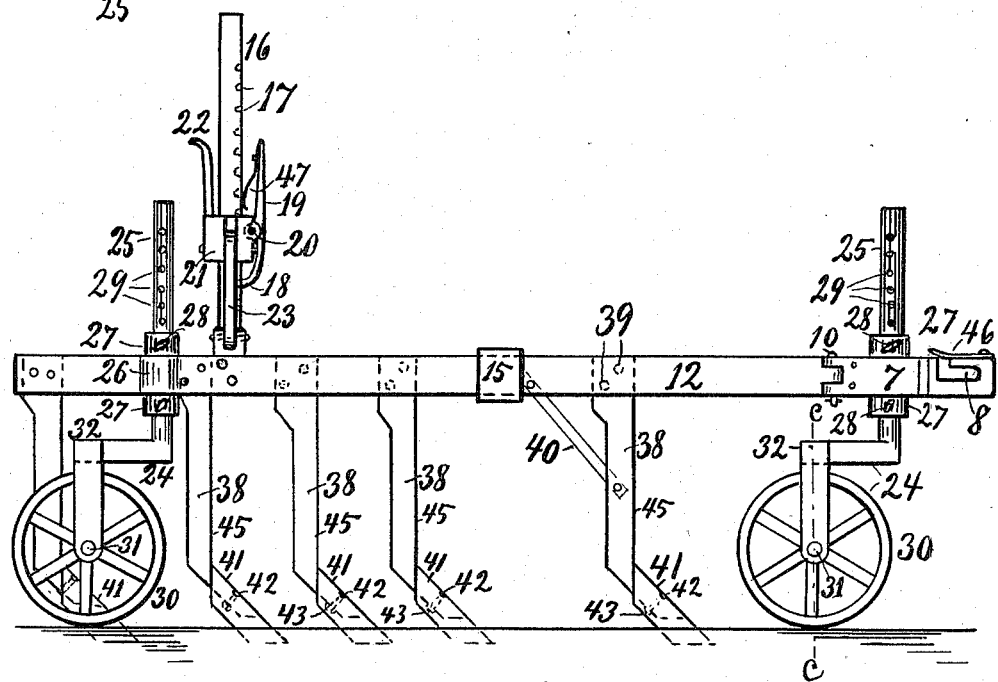
Figure 3:
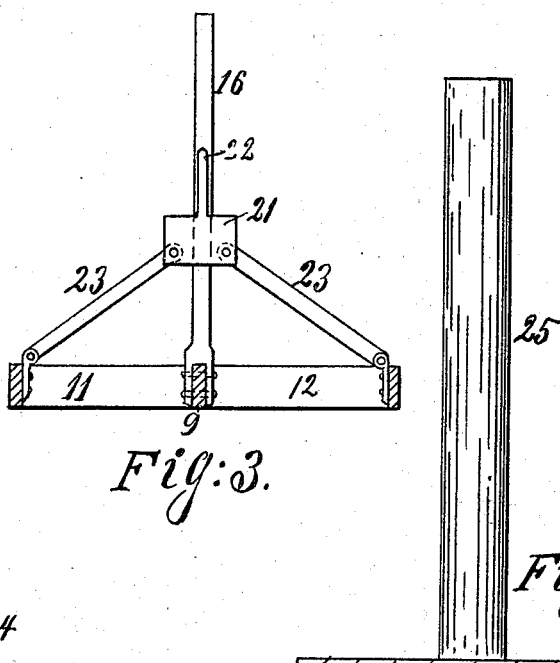
Figure 4:
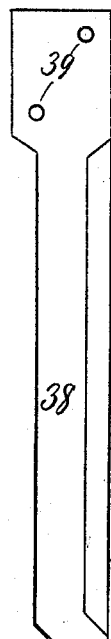
Figure 5:
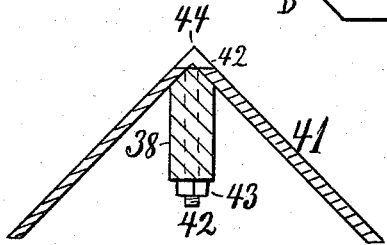
Figure 6:
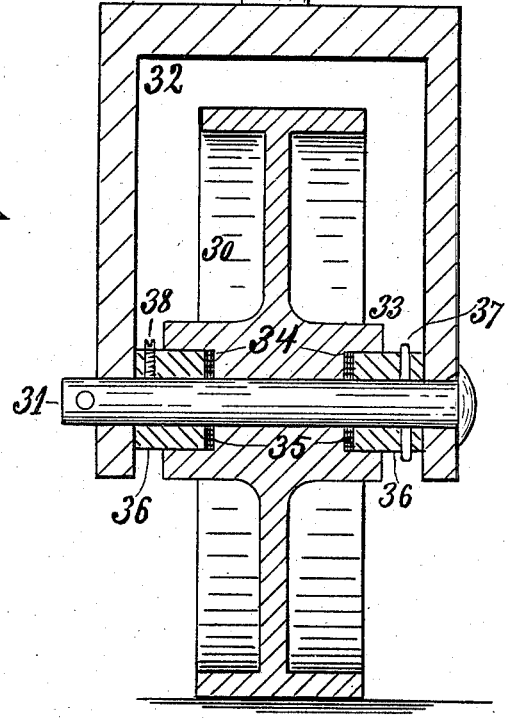

Figure 1 is a top or plan view of my cultivator. Fig. 2 is a side elevation of Fig. 1. Fig. 3 is a rear cross-section of the frame, as on the line $a\ a$ in Fig. 1. Fig. 4 is an enlarged detail view of one of the cultivator-teeth. Fig. 5 is a cross-section on the line $b\ b$ in Fig. 4. Fig. 6 is an enlarged sectional rear view of one of the casters, as on the line $c\ c$ in Fig. 2.

Referring to the various parts in the drawings by reference-numerals, 7 may be termed the "draw-head" of the cultivator. This head is provided with a spring-covered hook 8, by which the cultivator is drawn by a hitching-link in the usual manner. In the rear of said head is secured a central bar 9, and to the sides of the head are pivotally secured at 10 the front ends of the two side bars 11 and 12, which may be spread or closed by swinging them in the horizontal plan on their pivots 10. Near the rear end of the center bar 9 I secure pivotally at 13 the rear end of an oblique bar 14, which has its front end pivotally supported by a socket or guide 15, sliding upon the bar 12, so that the bars 14 and 12 are self-adjustably connected.

Upon the center bar 9 is rigidly secured an upright 16, which is provided in its front side with indentures 17, in which engages the pointed end or tooth 18 of a spring-held thumb-lever 19, pivoted at 20 to a head 21, sliding upon the upright 16 and having a hand-hold 22, adapted to be grasped in the same hand of which the fingers press the lever 19, so as to unlock it from the indentures 17. The sliding head 21 is pivotally connected with the outer frame-bars 11 and 12 by the oblique braces 23. (Best shown in Fig. 3.) The whole frame thus described is mounted on three large casters 24, of which the round stems 25 are journaled one in the draw-head 7 and the other two in the enlarged rear ends 26 of the side bars 11 and 12. The frame is adjustable up and down on the stems of the casters by means of the collars 27, thumb set-screws 28, and indentures 29, provided in the sides of the stems for the screws to engage. The wheels 30 of the casters are journaled on the bolt or axle 31, (best shown in Fig. 6,) which is rigidly secured in the fork 32. The hub 33 of the wheel is provided in each side with an annular cavity 34, in which I place the soft packing 35 and then insert the snugly-fitted collars 36, which are secured on the axle 31 by pins, as 37, or set-screws, as 38, so that sand and dirt are excluded from the journal, partly by the collars 36 and partly by the packings 35, as a further safeguard.

The cultivator-teeth are each made up of a forwardly-bent arm 38, bolted to the frame-bars, as at 39, and may preferably have strengthening-braces, as 40, and an angularly-bent plate or tooth proper, as 41, which is secured at its center to the lower and forwardly-bent portion of the arm 38 by a bolt 42 and nut 43, so that either end of the plate 41 may be turned downward and used in the ground. The head of the bolt 42 and the foremost angular edge 44 of the plate 41 and 45 of the arm 38 are formed so sharp as to cut and divide the weeds and vines. It will be observed that on ordinary cultivators of similar construction as mine the teeth are usually arranged upon two bars in about the order shown on the bar 11 in Fig. 1, and the consequence is that when the bars are adjusted in close proximity to each other the teeth of both bars stand abreast in pairs, which, especially with the foremost teeth, results in a gathering and heaping up of the weeds upon the teeth, which is obviated in my machine by having the teeth arranged as shown in Fig. 1, three of them upon one side bar and one on the other side bar near its rear end, one tooth on the center bar and one upon the oblique bar 14. This places the lines in which the teeth move equal distances apart and still leaves no two teeth to come so near a transverse line that they can prevent each other from getting rid of the weeds. The only two teeth that come in a transverse line are those at the rear ends of the side bars, and they are so far apart that in using the cultivator they will never come close enough together to coöperate in gathering the weeds.

In operation the hitching-clevis is slipped under the spring 46 into the hook 8 and the machine drawn to the field on its large casters 24, which, it will be observed, are very open in the forks straddling the wheels, so as to prevent clogging of vines around the wheels. The set-screws 27 are then loosened and the frame lowered, so that the teeth cut the desired depth into the ground. The width of the machine is then fixed by pressing on the lever 19 and moving the sliding head 21 up or down, so that the side bars 11 and 12 close or spread to the desired point. The lever 19 is then released and, by the spring 47, caused to interlock its lower end in the upright 16. In so regulating the width of the machine the guide 15 slides on the bar 12 and adjusts itself to the required place.

It is obvious that this cultivator may have a seat for the driver, if so desired, and a pair of handles for the driver to rest his hands on and help steer the machine if he walks behind it; but seats and handles being old and common are not shown in my drawings, as the novel features can be understood without them.

Having thus described my invention, what I claim, and desire to secure by Letters Patent, is—

1. A cultivator having a frame consisting of a draw-head with a hitching-hook at its front end, a central frame-bar extending rearwardly therefrom, two side bars pivotally secured to and extending rearwardly from the draw-head, an oblique frame-bar pivoted near the rear end of the central bar and having its front end pivoted to a block or guide sliding upon one of the side bars, and teeth arranged upon all of said bars and means for spreading the side bars, substantially as shown and described and for the purpose set forth.

2. The cultivator having a draw-head and a rigid central frame-bar as 9, extending therefrom, the side frame-bars 11, and 12, hinged or pivoted thereto, with their front ends, the oblique bar 14, pivoted to the central bar and having its other end slidingly connected to one of the side bars and three cultivator-teeth secured to one of the side bars and one to the rear end of the opposite side bar; one tooth to the central bar and one near the middle of the oblique frame-bar, and means for spreading, closing, raising and lowering the frame, substantially as and for the purpose set forth.

In testimony whereof I affix my signature in presence of two witnesses.

FRANK E. JOHNSON.

Witnesses:
A. M. CARLSEN,
B. A. VARY.